US012675464B2

(12) United States Patent
Morelli

(10) Patent No.: US 12,675,464 B2
(45) Date of Patent: Jul. 7, 2026

(54) AUTOMATED BISECTING TOOL FOR REGRESSION DETECTION

(71) Applicant: SAP SE, Walldorf (DE)

(72) Inventor: Canberk Morelli, Mannheim (DE)

(73) Assignee: SAP SE, Walldorf (DE)

( * ) Notice: Subject to any disclaimer, the term of this patent is extended or adjusted under 35 U.S.C. 154(b) by 5 days.

(21) Appl. No.: 18/776,065

(22) Filed: Jul. 17, 2024

(65) Prior Publication Data

US 2026/0086997 A1     Mar. 26, 2026

(51) Int. Cl.
*G06F 16/23*          (2019.01)
*G06F 16/21*          (2019.01)
(52) U.S. Cl.
CPC ........ G06F 16/2379 (2019.01); G06F 16/217 (2019.01)
(58) Field of Classification Search
CPC .... G06F 16/2379; G06F 16/217; G06F 11/36; G06F 11/362; G06F 11/3664; G06F 11/3668; G06F 11/3696
See application file for complete search history.

(56) References Cited

U.S. PATENT DOCUMENTS 9,898,385 B1 * 2/2018 O'Dowd ............. G06F 11/3476
2018/0217920 A1 * 8/2018 Bhojan ............... G06F 11/3684

2018/0307593 A1 * 10/2018 Assulin ............... G06F 11/3692
2023/0077774 A1 * 3/2023 Ocariza ............... G06F 11/3688
                                                     717/122
2024/0020112 A1 * 1/2024 Lin ..................... G06F 11/3688
2025/0390420 A1 * 12/2025 Wakabayashi ........ G06F 11/368

* cited by examiner

*Primary Examiner* — Charles Rones
*Assistant Examiner* — Mohammad S Bhuyan
(74) *Attorney, Agent, or Firm* — Mintz Levin Cohn Ferris Glovsky and Popeo. P.C.

(57)          ABSTRACT

Arrangements for intelligent regression detection are provided. Initial parameters including a first commit and a second commit may be received and a midpoint may be identified. A test may be executed at the midpoint. A regression detection algorithm may be used to determine whether a regression is present at the midpoint. The regression detection algorithm may automatically identify patterns from test results indicative of regressions and detect regressions based on the identified patterns. The midpoint may be set as the first commit or the second commit based on whether the regression is present at the midpoint. A new midpoint may be identified between the updated initial parameters. A test may be executed to determine whether the regression is present at the new midpoint. A search space of commit points may be automatically iteratively refined using the new midpoint at each iteration until a single commit causing the regression is identified.

18 Claims, 4 Drawing Sheets

← 300

Initial
State good　　　　　mid　　　　　bad 1 2 3 4 5 6 (7) 8 9 10 11 12 13　commits

Regression at 7,
check 4 good　　mid　　bad 1 2 3 (4) 5 6 7

No regression at 4,
check 6 good　　mid bad 4 5 (6) 7

Regression at 6,
check 5 good mid bad 4 (5) 6 good bad 4 (5)

good bad 5 (6)

Regression at 5,
5 is the first bad commit

No regression at 5,
6 is the first bad commit

400

PROCESSOR
410

MEMORY
420

STORAGE
DEVICE
430

INPUT/OUTPUT
DEVICES
440

BUS
450

AUTOMATED BISECTING TOOL FOR REGRESSION DETECTION

TECHNICAL FIELD

The subject matter described herein relates generally to data processing and more specifically to an automated regression analysis and bisecting tool for database performance and functionality.

BACKGROUND

In the realm of database development, tracking down the source of functional and performance regressions is a time-consuming, error-prone, and inefficient process. For example, in troubleshooting test failures that occurred during a testing phase of an integration pipeline, it is often difficult to pinpoint the commit that caused the failure. Existing solutions often lack efficiency and fail to provide automated, systematic regression detection.

SUMMARY

Methods, systems, and articles of manufacture, including computer program products, are provided for automated regression analysis and bisecting for database performance and functionality. In one aspect, there is provided a system including at least one processor and at least one memory. The at least one memory can store instructions that cause operations when executed by the at least one processor. The operations may include: receiving initial parameters including a first commit and a second commit, wherein the first commit and the second commit comprise endpoints of an interval; identifying a midpoint between the first commit and the second commit, wherein the midpoint represents a commit to be tested; executing a test of the commit at the midpoint; determining, using a regression detection algorithm, whether a regression is present at the midpoint, wherein the regression detection algorithm automatically identifies patterns from test results indicative of regressions and detects regressions based on the identified patterns; setting the midpoint as the first commit or the second commit based on whether the regression is present at the midpoint, wherein the setting updates the initial parameters; identifying a new midpoint between the updated initial parameters, wherein the new midpoint represents a new commit to be tested; and automatically iteratively refining a search space of commit points using the new midpoint at each iteration until a single commit is identified, wherein the single commit corresponds to a commit causing the regression.

In some variations, one or more of the features disclosed herein including the following features can optionally be included in any feasible combination. In some variations, the first commit may include a commit point in a commit history known to not contain the regression.

In some variations, the second commit may include a commit point in a commit history known to contain the regression.

In some variations, the operations may further include verifying a state of the first commit and a state of the second commit.

In some variations, the operations may further include pausing a regression bisecting operation in response to an error; and continuing the regression bisecting operation from a paused point.

In some variations, the operations may further include storing regression bisecting decisions in a log; and replaying the log in subsequent test runs.

In some variations, the operations may further include automatically calculating a baseline for the first commit.

In some variations, the regression may include a functional regression or a performance regression.

In another aspect, there is provided a method for automated regression analysis and bisecting tool for database performance and functionality. The method may include: receiving initial parameters including a first commit and a second commit, wherein the first commit and the second commit comprise endpoints of an interval; identifying a midpoint between the first commit and the second commit, wherein the midpoint represents a commit to be tested; executing a test of the commit at the midpoint; determining, using a regression detection algorithm, whether a regression is present at the midpoint, wherein the regression detection algorithm automatically identifies patterns from test results indicative of regressions and detects regressions based on the identified patterns; setting the midpoint as the first commit or the second commit based on whether the regression is present at the midpoint, wherein the setting updates the initial parameters; identifying a new midpoint between the updated initial parameters, wherein the new midpoint represents a new commit to be tested; and automatically iteratively refining a search space of commit points using the new midpoint at each iteration until a single commit is identified, wherein the single commit corresponds to a commit causing the regression.

In some variations, one or more of the features disclosed herein including the following features can optionally be included in any feasible combination. In some variations, the first commit may include a commit point in a commit history known to not contain the regression.

In some variations, the second commit may include a commit point in a commit history known to contain the regression.

In some variations, the method may further include verifying a state of the first commit and a state of the second commit.

In some variations, the method may further include pausing a regression bisecting operation in response to an error; and continuing the regression bisecting operation from a paused point.

In some variations, the method may further include storing regression bisecting decisions in a log; and replaying the log in subsequent test runs.

In some variations, the method may further include automatically calculating a baseline for the first commit.

In some variations, the regression may include a functional regression or a performance regression.

In another aspect, there is provided a computer program product that includes a non-transitory computer readable medium. The non-transitory computer readable medium may store instructions that cause operations when executed by at least one processor. The operations may include: receiving initial parameters including a first commit and a second commit, wherein the first commit and the second commit comprise endpoints of an interval; identifying a midpoint between the first commit and the second commit, wherein the midpoint represents a commit to be tested; executing a test of the commit at the midpoint; determining, using a regression detection algorithm, whether a regression is present at the midpoint, wherein the regression detection algorithm automatically identifies patterns from test results indicative of regressions and detects regressions based on the identified patterns; setting the midpoint as the first commit or the second commit based on whether the regression is present at the midpoint, wherein the setting updates the initial parameters; identifying a new midpoint between the updated initial parameters, wherein the new midpoint represents a new commit to be tested; and automatically iteratively refining a search space of commit points using the new midpoint at each iteration until a single commit is identified, wherein the single commit corresponds to a commit causing the regression.

In some variations, one or more of the features disclosed herein including the following features can optionally be included in any feasible combination. In some variations, the first commit may include a commit point in a commit history known to not contain the regression.

In some variations, the second commit may include a commit point in a commit history known to contain the regression.

In some variations, the operations may further include verifying a state of the first commit and a state of the second commit.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Aspects of the disclosure provide a technical solution that addresses problems associated with regression detection for database performance and functionality. Aspects of the disclosure introduce an automated tool designed to efficiently identify the commits responsible for functional and performance regressions in a database (e.g., an SAP HANA database). In some aspects, the tool integrates regression-bisecting and binary search methodologies within the specific context of a database. In further aspects, the tool incorporates additional steps for running tests and detecting regressions. Advantageously, the time and effort required to pinpoint the root cause of regressions is significantly reduced. These and various other arrangements will be discussed more fully below.

Figure 1:
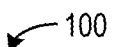
FIG. 1 depicts an illustrative computing environment for intelligent regression detection in accordance with some example embodiments.
Figure 1:
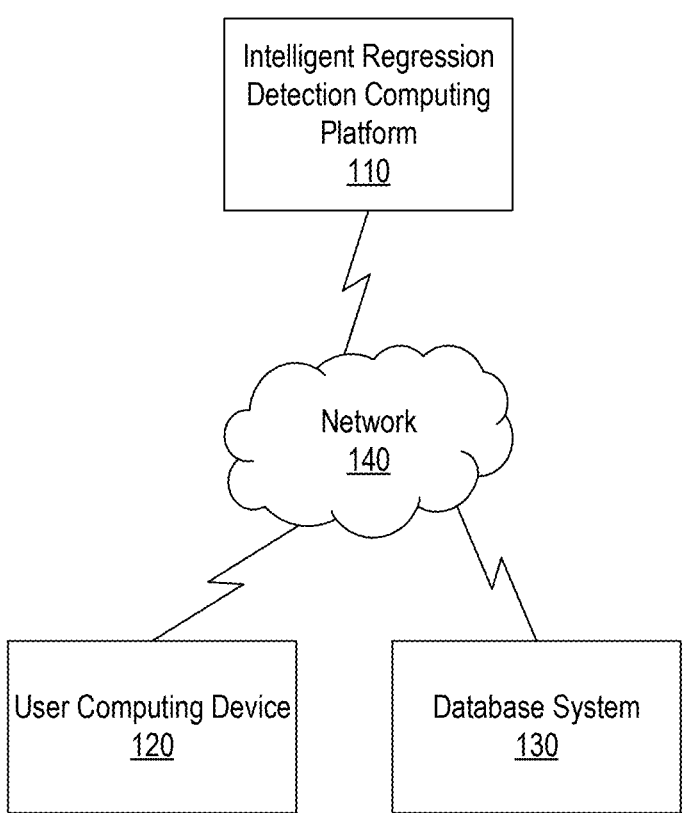

FIG. 1 depicts an illustrative computing environment 100 for intelligent regression detection in accordance with some example embodiments. Referring to FIG. 1, the computing environment 100 may include one or more computing devices and/or other computing systems. For example, computing environment 100 may include an intelligent regression detection computing platform 110, a user computing device 120, and a database system 130. Intelligent regression detection computing platform 110 may include one or more computing devices configured to perform one or more of the functions described herein. As discussed in further detail below, intelligent regression detection computing platform 110 may employ an automated regression-bisecting algorithm that systematically divides the commit history, employing a binary search methodology to iteratively test and evaluate commits, pinpointing the precise commit where the regression is introduced. Additionally, intelligent regression detection computing platform 110 may incorporate a regression-detection algorithm designed to analyze test results and identify regression patterns.

User computing device 120 may be a processor-based device including, for example, a smartphone, a desktop computer, tablet computer, a wearable apparatus, a virtual assistant, an Internet-of-Things (IOT) appliance, and/or the like.

Database system 130 may include, for example, a relational database, an in-memory database, a graph database, a key-value store, a document store, and/or the like. In some examples, the intelligent regression detection computing platform 110 may maintain (e.g., store) various types of data, including static and nonstatic data (e.g., commit history, log of decisions made during a bisecting process, and/or the like) in database system 130 coupled with the intelligent regression detection computing platform 110.

Referring again to FIG. 1, the intelligent regression detection computing platform 110, the user computing device 120, and the database system 130, may be communicatively coupled via a network 140. The network 140 may be a wired and/or wireless network including, for example, a wide area network (WAN), local area network (LAN), a virtual local area network (VLAN), the Internet, and/or the like.

Figure 2:
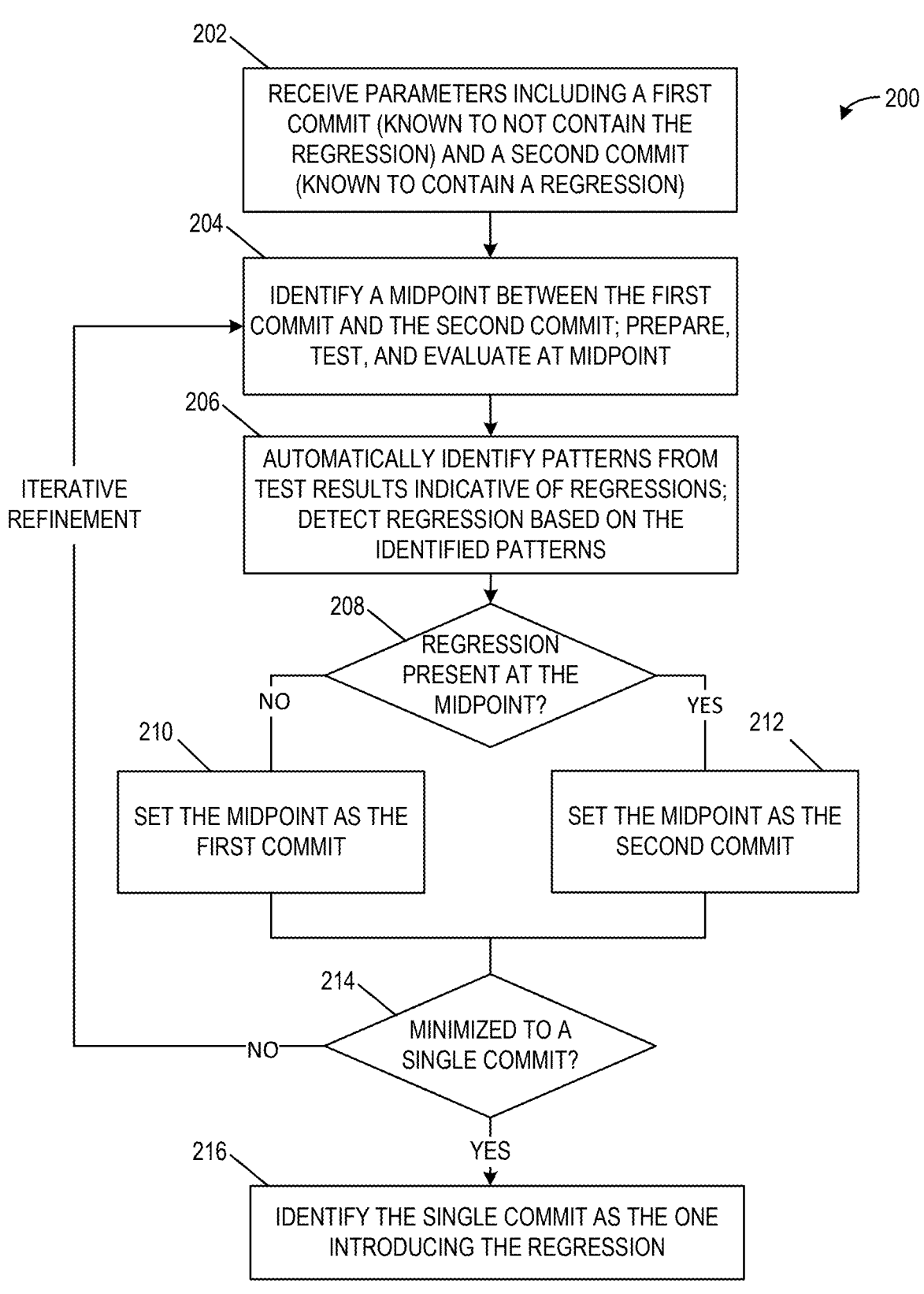
FIG. 2 depicts a flowchart illustrating a process for intelligent regression detection in accordance with some example embodiments.
Figure 3:
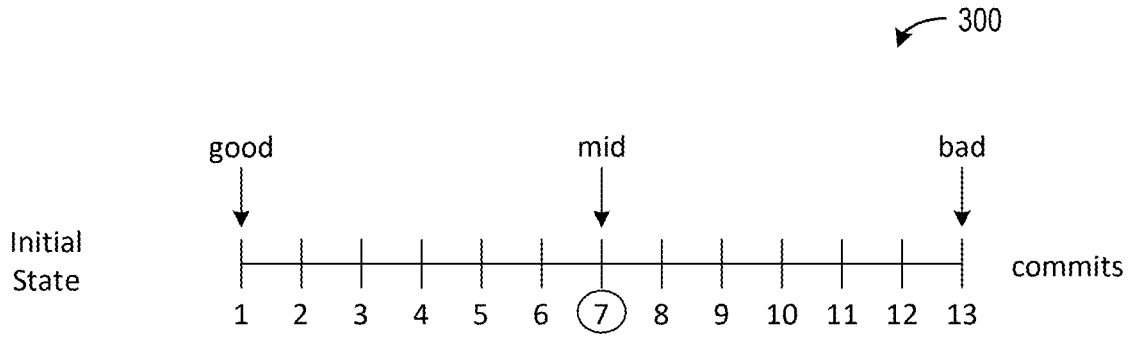
FIG. 3 depicts linear graphs illustrating a process for intelligent regression detection in accordance with some example embodiments.
Figure 3:
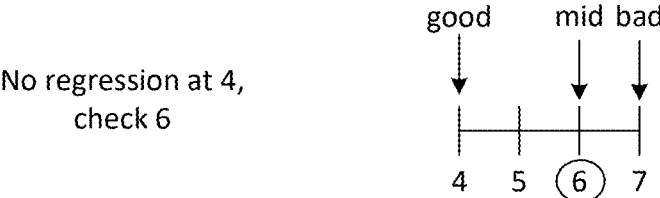
Figure 3:
Figure 3:

FIGS. 2 and 3 will be discussed together. FIG. 2 depicts a flowchart 200 illustrating a process for intelligent regression detection in accordance with some example embodiments. FIG. 3 depicts linear graphs 300 illustrating a process for intelligent regression detection in accordance with some example embodiments.

Referring to FIG. 2, at step 202, intelligent regression detection computing platform 110 may receive initial parameters including a first commit and a second commit. The first commit and the second commit may include endpoints (e.g., beginning or ending point) of a range or interval. The first commit may include a commit point in a commit history known to not contain a regression (also referred to as a "good" commit). The second commit may include a commit point in a commit history known to contain a regression (also referred to as a "bad" commit). In some examples, the first commit is a point of an interval before the second commit within the interval (i.e., the "good" commit is before the "bad" commit was introduced). Intelligent regression detection computing platform 110 may employ a regression-bisecting algorithm as discussed in further detail below. The regression-bisecting algorithm employs a binary search approach, efficiently narrowing down the search space and identifying the precise commit introducing a regression. Regressions may include a functional regression or a performance regression. In this regard, functional testing verifies that each function of a software application operates as intended and meets specified requirements or specifications. Performance testing focuses on evaluating a system's performance and scalability, ensuring that software applications perform as expected under various conditions (e.g., load, stress, scalability).

Additionally, in some implementations, intelligent regression detection computing platform 110 may verify a state of the first commit and a state of the second commit (e.g., checking that the assumptions hold). For example, intelligent regression detection computing platform 110 may verify that it can reproduce the regression at the "bad" commit (e.g., a version where a regression is observed) and cannot reproduce the regression at the "good" commit (e.g., a version where the system functions correctly) before initiating the bisecting process.

Additionally, in some implementations, intelligent regression detection computing platform 110 may take, as input parameters for the bisecting and detection process, starting points (e.g., first and second commits), specific tests/benchmarks showcasing the regression, and/or hints for regression detection.

At step 204, intelligent regression detection computing platform 110 may identify a midpoint between the first commit and the second commit, where the midpoint represents a commit to be tested. Intelligent regression detection computing platform 110 may execute a test of the commit at the midpoint. For example, intelligent regression detection computing platform 110 may prepare the system to represent the state at the midpoint (e.g., compile source code, clean the database, restart the database, stop additional activities that can interfere with the evaluation). Then, intelligent regression detection computing platform 110 may execute the specified test or benchmark on the system and evaluate whether the results indicate a regression. In some examples, intelligent regression detection computing platform 110 may automatically calculate a baseline for the first commit. For instance, at the "good" commit, intelligent regression detection computing platform 110 may run a benchmark with a specified configuration multiple times, collecting samples that represent the baseline.

At step 206, the regression detection algorithm may automatically identify patterns from test results indicative of regressions and detect regressions based on the identified patterns. At step 208, intelligent regression detection computing platform 110 may determine, using a regression detection algorithm, whether a regression is present at the midpoint (e.g., the tested commit). Then, intelligent regression detection computing platform 110 may set the midpoint as the first commit or the second commit based on whether the regression is present at the midpoint. For example, if no regression is found, intelligent regression detection computing platform 110 may, at step 210, set the midpoint as the first commit (e.g., as the new "good" commit). If a regression is found, intelligent regression detection computing platform 110 may, at step 212, set the midpoint as the second commit (e.g., the new "bad" commit). This setting updates the initial parameters.

At step 214, intelligent regression detection computing platform 110 may identify a new midpoint between the updated initial parameters, where the new midpoint represents a new commit to be tested. The process (e.g., steps 204-214) may be repeated by identifying a new midpoint between the updated "good" and "bad" commits. Intelligent regression detection computing platform 110 may prepare, test, and evaluate the system at the new midpoint.

Intelligent regression detection computing platform 110 may automatically iteratively refine a search space of commit points using the new midpoint at each iteration until a single commit is identified at step 216. For example, this iterative refinement process may narrow down the search space by halving it with each iteration. Intelligent regression detection computing platform 110 may conclude when the search space is minimized to a single commit. This single commit may be identified as the commit causing or introducing the regression.

In one non-limiting example shown in FIG. 3, assume it is known that commit 1 is "good" (e.g., known to not contain a regression) and commit 13 is "bad" (e.g., known to contain a regression). However, it is not known which commit between commit 1 and commit 13 was the first commit to introduce the regression. In each step, the intelligent regression detection computing platform 110 may check the midpoint and that midpoint will become the new "bad" commit or "good" commit, depending on whether a regression is detected. Assuming a regression is found at commit 7, commit 7 becomes the new "bad" commit and commit 4 becomes the new midpoint. Then, commit 4 is checked. Assuming no regression is found at commit 4, commit 4 becomes the new "good" commit point, and commit 6 becomes the new midpoint. Then, commit 6 is checked. Assuming a regression is found at commit 6, commit 6 becomes the new "bad" commit point, and commit 5 becomes the new midpoint. Then, commit 5 is checked. If a regression is found, commit 5 is identified as the first "bad" commit. On the other hand, if no regression is found, commit 6 is identified as the first "bad"commit.

Complementing the bisecting algorithm, intelligent regression detection computing platform 110 may employ a regression-detection algorithm that analyzes test results and identifies patterns indicative of regressions. For functional regressions, the regression may be detected if the specified test fails with a specified symptom (e.g., printing a string that indicates a specific failure). For performance regressions, the regression may be detected if collected benchmark samples indicate a regression compared to baseline samples. Different strategies may be applied while comparing the samples (e.g., statistical significance with confidence intervals, simple average, or percentage change calculation).

Additionally or alternatively, in some example implementations, intelligent regression detection computing platform 110 may provide an option to pause on unexpected errors. For example, when encountering unexpected errors, intelligent regression detection computing platform 110 may pause a regression bisecting operation, allowing users to handle the issue manually, and continue the regression bisecting operation from a paused point.

Additionally or alternatively, in some example implementations, intelligent regression detection computing platform 110 may include a replay feature which saves decisions made during the bisecting process in a log (e.g., in database system 130). This saved log can be replayed in subsequent runs. For example, if a test run finishes unexpectedly due to some system failure, users may continue the run using the replay log without having to spend time repeating the previously finished steps.

Figure 4:
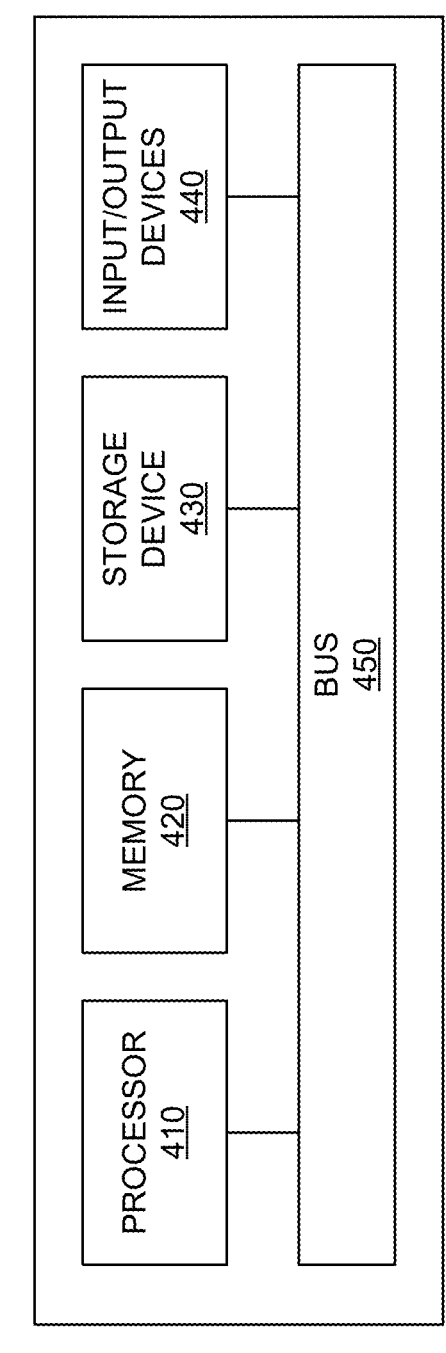
FIG. 4 depicts a block diagram illustrating a computing system, in accordance with some example embodiments.

FIG. 4 depicts a block diagram illustrating a computing system 400 consistent with implementations of the current subject matter. Referring to FIGS. 1-4, the computing system 400 can be used to implement the intelligent regression detection computing platform 110 and/or any components therein.

As shown in FIG. 4, the computing system 400 can include a processor 410, a memory 420, a storage device 430, and input/output devices 440. The processor 410, the memory 420, the storage device 430, and the input/output devices 440 can be interconnected via a system bus 450. The processor 410 is capable of processing instructions for execution within the computing system 400. Such executed instructions can implement one or more components of, for example, the intelligent regression detection computing platform 110. In some implementations of the current subject matter, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a solid-state device, a floppy disk device, a hard disk device, an optical disk device, a tape device, and/or any other suitable persistent storage means. The input/output device 440 provides input/output operations for the computing system 400. In some implementations of the current subject matter, the input/output device 440 includes a keyboard and/or pointing device. In various implementations, the input/output device 440 includes a display unit for displaying graphical user interfaces.

According to some implementations of the current subject matter, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some implementations of the current subject matter, the computing system 400 can be used to execute various interactive computer software applications that can be used for organization, analysis and/or storage of data in various (e.g., tabular) format (e.g., Microsoft Excel®, and/or any other type of software). Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising:

at least one processor; and at least one memory storing instructions, which when executed by the at least one processor, result in operations for regression bisecting comprising:

receiving initial parameters including a first commit and a second commit, wherein the first commit and the second commit comprise endpoints of an interval;

identifying a midpoint between the first commit and the second commit, wherein the midpoint represents a commit to be tested;

executing a test of the commit at the midpoint;

determining, using a regression detection algorithm, whether a regression is present at the midpoint, wherein the regression detection algorithm automatically identifies patterns from test results indicative of regressions and detects regressions based on the identified patterns;

setting the midpoint as the first commit or the second commit based on whether the regression is present at the midpoint, wherein the setting updates the initial parameters;

identifying a new midpoint between the updated initial parameters, wherein the new midpoint represents a new commit to be tested; and automatically iteratively refining a search space of commit points using the new midpoint at each iteration until a single commit is identified, wherein the single commit corresponds to a commit causing the regression.

Example 2: The system of Example 1, wherein the first commit comprises a commit point in a commit history known to not contain the regression.

Example 3: The system of any of Examples 1-2, wherein the second commit comprises a commit point in a commit history known to contain the regression.

Example 4: The system of any of Examples 1-3, further comprising: verifying a state of the first commit and a state of the second commit.

Example 5: The system of any of Examples 1-4, further comprising: pausing a regression bisecting operation in response to an error; and continuing the regression bisecting operation from a paused point.

Example 6: The system of any of Examples 1-5, further comprising: storing regression bisecting decisions in a log; and replaying the log in subsequent test runs.

Example 7: The system of any of Examples 1-6, further comprising: automatically calculating a baseline for the first commit.

Example 8: The system of any of Examples 1-7, wherein the regression comprises a functional regression or a performance regression.

Example 9: A computer-implemented method comprising:

receiving initial parameters including a first commit and a second commit, wherein the first commit and the second commit comprise endpoints of an interval;

identifying a midpoint between the first commit and the second commit, wherein the midpoint represents a commit to be tested;

executing a test of the commit at the midpoint;

determining, using a regression detection algorithm, whether a regression is present at the midpoint, wherein the regression detection algorithm automatically identifies patterns from test results indicative of regressions and detects regressions based on the identified patterns;

setting the midpoint as the first commit or the second commit based on whether the regression is present at the midpoint, wherein the setting updates the initial parameters;

identifying a new midpoint between the updated initial parameters, wherein the new midpoint represents a new commit to be tested; and automatically iteratively refining a search space of commit points using the new midpoint at each iteration until a single commit is identified, wherein the single commit corresponds to a commit causing the regression.

Example 10: The computer-implemented method of Example 9, wherein the first commit comprises a commit point in a commit history known to not contain the regression.

Example 11: The computer-implemented method of any of Examples 9-10, wherein the second commit comprises a commit point in a commit history known to contain the regression.

Example 12: The computer-implemented method of any of Examples 9-11, further comprising: verifying a state of the first commit and a state of the second commit.

Example 13: The computer-implemented method of any of Examples 9-12, further comprising: pausing a regression bisecting operation in response to an error; and continuing the regression bisecting operation from a paused point.

Example 14: The computer-implemented method of any of Examples 9-13, further comprising: storing regression bisecting decisions in a log; and replaying the log in subsequent test runs.

Example 15: The computer-implemented method of any of Examples 9-14, further comprising: automatically calculating a baseline for the first commit.

Example 16: The computer-implemented method of any of Examples 9-15, wherein the regression comprises a functional regression or a performance regression.

Example 17: A non-transitory computer-readable medium storing instructions, which when executed by at least one processor, result in operations comprising:

receiving initial parameters including a first commit and a second commit, wherein the first commit and the second commit comprise endpoints of an interval;

identifying a midpoint between the first commit and the second commit, wherein the midpoint represents a commit to be tested;

executing a test of the commit at the midpoint;

determining, using a regression detection algorithm, whether a regression is present at the midpoint, wherein the regression detection algorithm automatically identifies patterns from test results indicative of regressions and detects regressions based on the identified patterns;

setting the midpoint as the first commit or the second commit based on whether the regression is present at the midpoint, wherein the setting updates the initial parameters;

identifying a new midpoint between the updated initial parameters, wherein the new midpoint represents a new commit to be tested; and automatically iteratively refining a search space of commit points using the new midpoint at each iteration until a single commit is identified, wherein the single commit corresponds to a commit causing the regression.

Example 18: The non-transitory computer-readable medium of Example 17, wherein the first commit comprises a commit point in a commit history known to not contain the regression.

Example 19: The non-transitory computer-readable medium any of Examples 17-18, wherein the second commit comprises a commit point in a commit history known to contain the regression.

Example 20: The non-transitory computer-readable medium any of Examples 17-19, further comprising: verifying a state of the first commit and a state of the second commit.

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
at least one processor; and
at least one memory storing instructions, which when executed by the at least one processor, result in operations for regression bisecting comprising:
receiving initial parameters including a first commit and a second commit, wherein the first commit and the second commit comprise endpoints of an interval;
identifying a midpoint between the first commit and the second commit, wherein the midpoint represents a commit to be tested;
executing a test of the commit at the midpoint;
determining, using a regression detection algorithm, whether a regression is present at the midpoint, wherein the regression detection algorithm automatically identifies patterns from test results indicative of regressions and detects regressions based on the identified patterns, the identified patterns being associated with a specified symptom occurring at the midpoint when the regression is a functional regression and associated with benchmark samples collected at the midpoint when the regression is a performance regression;
setting the midpoint as the first commit or the second commit based on whether the regression is present at the midpoint, wherein the setting updates the initial parameters;
identifying a new midpoint between the updated initial parameters, wherein the new midpoint represents a new commit to be tested; and
automatically iteratively refining a search space of commit points using the new midpoint at each iteration until a single commit is identified, wherein the single commit corresponds to a commit causing the regression.

2. The system of claim 1, wherein the first commit comprises a commit point in a commit history known to not contain the regression.

3. The system of claim 1, wherein the second commit comprises a commit point in a commit history known to contain the regression.

4. The system of claim 1, further comprising: verifying a state of the first commit and a state of the second commit.

5. The system of claim 1, further comprising:
pausing a regression bisecting operation in response to an error; and
continuing the regression bisecting operation from a paused point.

6. The system of claim 1, further comprising:
storing regression bisecting decisions in a log; and
replaying the log in subsequent test runs.

7. The system of claim 1, further comprising:
automatically calculating a baseline for the first commit.

8. A computer-implemented method comprising:
receiving initial parameters including a first commit and a second commit, wherein the first commit and the second commit comprise endpoints of an interval;
identifying a midpoint between the first commit and the second commit, wherein the midpoint represents a commit to be tested;
executing a test of the commit at the midpoint;
determining, using a regression detection algorithm, whether a regression is present at the midpoint, wherein the regression detection algorithm automatically identifies patterns from test results indicative of regressions and detects regressions based on the identified patterns, the identified patterns being associated with a specified symptom occurring at the midpoint when the regression is a functional regression and associated with benchmark samples collected at the midpoint when the regression is a performance regression;
setting the midpoint as the first commit or the second commit based on whether the regression is present at the midpoint, wherein the setting updates the initial parameters;
identifying a new midpoint between the updated initial parameters, wherein the new midpoint represents a new commit to be tested; and
automatically iteratively refining a search space of commit points using the new midpoint at each iteration until a single commit is identified, wherein the single commit corresponds to a commit causing the regression.

9. The computer-implemented method of claim 8, wherein the first commit comprises a commit point in a commit history known to not contain the regression.

10. The computer-implemented method of claim 8, wherein the second commit comprises a commit point in a commit history known to contain the regression.

11. The computer-implemented method of claim 8, further comprising:
   verifying a state of the first commit and a state of the second commit.

12. The computer-implemented method of claim 8, further comprising:
   pausing a regression bisecting operation in response to an error; and
   continuing the regression bisecting operation from a paused point.

13. The computer-implemented method of claim 8, further comprising:
   storing regression bisecting decisions in a log; and
   replaying the log in subsequent test runs.

14. The computer-implemented method of claim 8, further comprising:
   automatically calculating a baseline for the first commit.

15. A non-transitory computer readable medium storing instructions, which when executed by at least one processor, result in operations comprising:
   receiving initial parameters including a first commit and a second commit, wherein the first commit and the second commit comprise endpoints of an interval;
   identifying a midpoint between the first commit and the second commit, wherein the midpoint represents a commit to be tested;

executing a test of the commit at the midpoint;
   determining, using a regression detection algorithm, whether a regression is present at the midpoint, wherein the regression detection algorithm automatically identifies patterns from test results indicative of regressions and detects regressions based on the identified patterns, the identified patterns being associated with a specified symptom occurring at the midpoint when the regression is a functional regression and associated with benchmark samples collected at the midpoint when the regression is a performance regression;
   setting the midpoint as the first commit or the second commit based on whether the regression is present at the midpoint, wherein the setting updates the initial parameters;
   identifying a new midpoint between the updated initial parameters, wherein the new midpoint represents a new commit to be tested; and
   automatically iteratively refining a search space of commit points using the new midpoint at each iteration until a single commit is identified, wherein the single commit corresponds to a commit causing the regression.

16. The non-transitory computer readable medium of claim 15, wherein the first commit comprises a commit point in a commit history known to not contain the regression.

17. The non-transitory computer readable medium of claim 15, wherein the second commit comprises a commit point in a commit history known to contain the regression.

18. The non-transitory computer readable medium of claim 15, further comprising: verifying a state of the first commit and a state of the second commit.

* * * * *